United States Patent [19]

Miller et al.

[11] Patent Number: 5,062,667
[45] Date of Patent: Nov. 5, 1991

[54] CONNECTION SEAL

[75] Inventors: Jack E. Miller, Houston; Joe R. Fowler, Spring; Stewart A. Fox; Bryan Lane, both of Houston, all of Tex.

[73] Assignee: National-Oilwell, Houston, Tex.

[21] Appl. No.: 467,600

[22] Filed: Jan. 19, 1990

[51] Int. Cl.$^5$ .............................................. F16L 15/04
[52] U.S. Cl. ..................................... 285/381; 285/917
[58] Field of Search ................. 285/917, 355, 349, 381

[56] References Cited

U.S. PATENT DOCUMENTS

| Re. 33,199 | 4/1990 | Karr, Jr. | 285/917 |
|---|---|---|---|
| 1,906,826 | 5/1933 | Smith et al. | 285/917 |
| 2,181,343 | 11/1939 | Reimschissel | 285/917 |
| 2,539,057 | 1/1951 | Brown . | |
| 2,918,315 | 12/1959 | Peter et al. . | |
| 3,125,362 | 3/1964 | Borg | 285/917 |
| 3,166,345 | 1/1965 | Pinkard . | |
| 3,275,348 | 9/1966 | Scott . | |
| 3,382,563 | 5/1968 | Barroil et al. . | |
| 3,618,989 | 11/1971 | Ito | 285/917 |
| 3,668,754 | 6/1972 | Boast . | |
| 3,998,479 | 12/1976 | Bishop . | |
| 4,537,406 | 8/1985 | Hirasuna et al. . | |
| 4,601,498 | 7/1986 | Haugen . | |
| 4,793,382 | 12/1988 | Szalvay . | |

FOREIGN PATENT DOCUMENTS 43590   1/1982   European Pat. Off. ............ 285/917

Primary Examiner—Eric K. Nicholson
Attorney, Agent, or Firm—David A. Rose

[57] ABSTRACT

A tubular pin member is received within a tubular box member. The pin member includes a reduced diameter portion forming a shoulder having an annular groove in the shoulder. A metal seal ring of aluminum bronze is shrink fitted onto the outer diameter wall of the annular groove. The tubular box member and the tubular pin member have cooperable connection means connecting the tubular members. The metal seal ring sealingly engages the box thereby establishing a metal-to-metal seal between the tubular members. Pressure in the flow bore of the tubular members applies a force to the inner diameter of the metal seal ring to enhance the metal-to-metal sealing engagement between the seal ring and the outer diameter wall and the box.

16 Claims, 2 Drawing Sheets

CONNECTION SEAL

BACKGROUND OF THE INVENTION

This invention relates to seals for pipe connections and more particularly to replaceable metal seals for oilfield connections.

In subterranean oil and gas well applications, it is necessary to couple various sections of pipe together. In securing a pipe joint, it is desirable to provide a seal at the connection to prevent fluid flow. Threaded connections often maintain pressure differentials thereacross. The most common method of providing fluid and pressure integrity is to use elastomeric O-rings to seal the interface of the tubular members adjacent the threaded connection. However, increased drilling depths with greater down-hole pressures have caused the industry to request metal-to-metal seals between tubular members and associated components joined by threaded connections in a production or completion casing string. Normally, such metal-to-metal seals are machined into either the pin or box of the connection. Where the metal-to-metal seals have been machined into the steel members of the connection, it is often impossible to refurbish the metal-to-metal seal after retrieving that portion of the connection, either pin or box, on which the seal was machined. Any "ding", blemish, scoring, or corrosion of the metal-to-metal seal will cause the seal to be unusable thus requiring a new pipe joint or tool since the metal-to-metal seal cannot be refurbished or replaced. This is particularly expensive where the metal-to-metal seal is for the connection of a running tool, run-in and tie-back tool, tie-back tool or other oilfield tool. If the metal-to-metal seal could be refurbished or replaced, one tool for a particular size connection could be used with several strings merely by refurbishing or replacing the metal-to-metal seal.

U.S. Pat. No. 2,918,315 to Peter et al. discloses a metal-to-metal seal for sealing the connection between male and female members at the surface. The metal-to-metal seal includes a ring heated to expand its inner diameter for seating on the male pipe member. The female pipe member is threaded onto the male member so that the terminal end of the female member abuts the annular surface of the ring. The terminal end of the female member is then welded to the ring, which in turn, is cooled so that the ring is shrink fitted onto the male member.

U.S. Pat. No. 3,668,754 to Boast shows a non-oilfield pipe joint formed between a male pipe member and a female pipe member in which an independent annular element is heated in order to be positioned on the outer surface of the male member, and is subsequently cooled to shrink onto the pipe in intimate fitting engagement with projections and recesses on the male pipe member. A flange on the female pipe member engages the annular element to secure the fitting.

U.S. Pat. No. 4,537,406 to Hirasuna et al. discloses a seal assembly formed by disposing an annular shape memory material combined with a compliant seal within the counterbore of a female pipe member, disposing the male member in the counterbore and thereafter activating the annular member by threading the male and female members together to permit the annular member to assume its memory shape configuration, in which it forms a pressure and fluid-tight seal.

U.S. Pat. No. 4,601,498 to Hauoen discloses a metal-to-metal seal for a subterranean well tool in which an annular deformable metallic sleeve is placed about the terminal end of a male pipe member prior to threaded insertion of the male member into a recess in a female member.

U.S. Pat. Nos. 2,539,057; 3,166,345; 3,275,348; 3,382,563; 3,998,479; and 4,793,382 disclose other seals for threaded connections.

The principal deficiency of the prior art metal-to-metal seals are that they are normally machined into the metal body of one of the members of the connection and thus cannot be refurbished or replaced once damaged. Other connections with metal seal rings cannot be completed at a remote location. The present invention overcomes the deficiencies of these prior art sealed connections.

SUMMARY OF THE INVENTION

The present invention includes a replaceable metal seal ring for a remote connection. Although the metal seal ring may be installed on either the pin or box, in the preferred embodiment, the metal seal ring is installed on the tubular pin member to be received within a tubular box member. The pin member includes a reduced diameter portion forming a shoulder having an annular groove. The metal seal ring is shrink fitted onto the outer diameter wall of the annular groove. The tubular box member receives the tubular pin member therein with a cooperable connection means connecting the tubular members. The metal seal ring sealingly engages the interior surface of the box thereby establishing a metal-to-metal seal between the tubular members. Should the flow bore of the tubular members become pressurized, the pressure is applied to the inner diameter of the metal seal ring to enhance the metal-to-metal sealing engagement between the seal ring and the box.

Other objects and advantages of the invention will appear from the following description.

BRIEF DESCRIPTION OF THE DRAWINGS

For a detailed description of the preferred embodiment of the invention, reference will now be made to the accompanying drawings wherein.

DESCRIPTION OF THE PREFERRED EMBODIMENT

Figure 1:
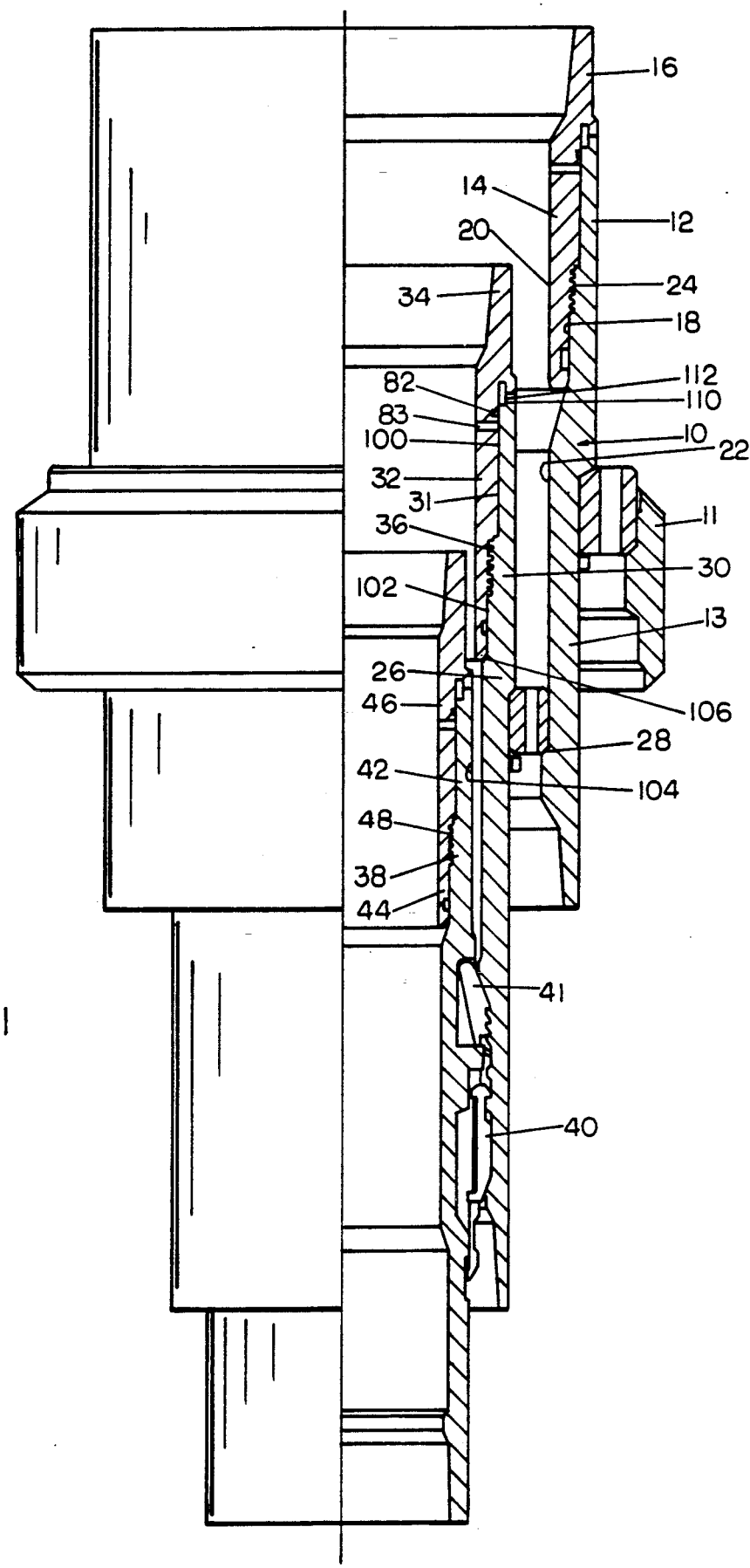
FIG. 1 is a section view of a connection utilizing the seals of the present invention.

The seals of the present invention may be used for any connection but are particularly useful for remote oilfield connections exposed to high pressures. Such oilfield connections include connections for tubing, casing, drill pipe, running tools, casing hangers, stab-in and tie-back tools, or any retrievable oilfield equipment having a sealed connection. FIG. 1 illustrates the environment for several of these types of connections.

Referring to FIG. 1, there is shown a subsea wellhead 10 suspending a plurality of casing strings into a well. The hangers for such casing strings utilize connections having the seals of the present invention. A large conductor casing (not shown) is initially installed in the ocean floor to a suitable depth. A butt weld ring 11 is attached, such as by welding, to the top of the conductor casing. Butt weld ring 1 supports an outermost hanger 13 having a male member or box 12 adapted for receiving a female member or pin 14 on the lower terminal end of a string of riser pipe 16 extending to the surface. The box 12 has an enlarged diameter portion 18 whereby the inner diameter 20 of pin 14 is substantially the same as the flow bore 22 of wellhead 10. Cooperable attachment means 24 on the outer diameter of pin 14 and enlarged diameter portion 18 of box 12 engage to provide the connection between hanger 13 and riser pipe 16. A blowout preventer stack (not shown) may be connected to the upper end of riser pipe 16 at the surface.

As shown in FIG. 1, a series of hangers may be stacked within wellhead 10. Outer casing hanger 26 is shown supported within wellhead 10 by support shoulder 28. Hanger 26 includes a male member or box 30 adapted for receiving a female member or pin 32 on the lower end of a stab-in and tie-back tool 34. Cooperable connection means 36 are provided on the exterior of pin 32 and on the interior of box 30 for connecting stab-in and tie-back tool 34 with outer casing hanger 26. Outer casing hanger 26 supports a string of casing (not shown) within the well.

An inner casing hanger 38 is supported within outer casing hanger 26 by a landing means 40 and a latching means 41. Inner hanger 38 includes a box 42 at its upper end for receiving a pin 44 on a tie-back tool 46. Cooperable coupling means 48 are affixed to the inner diameter of box 42 and outer diameter of pin 44 to connect tie-back tool 46 to inner casing hanger 38. Inner casing hanger 38 suspends a string of casing (not shown) within the casing string supported by outer casing hanger 26.

Figures 2, 3, 4:
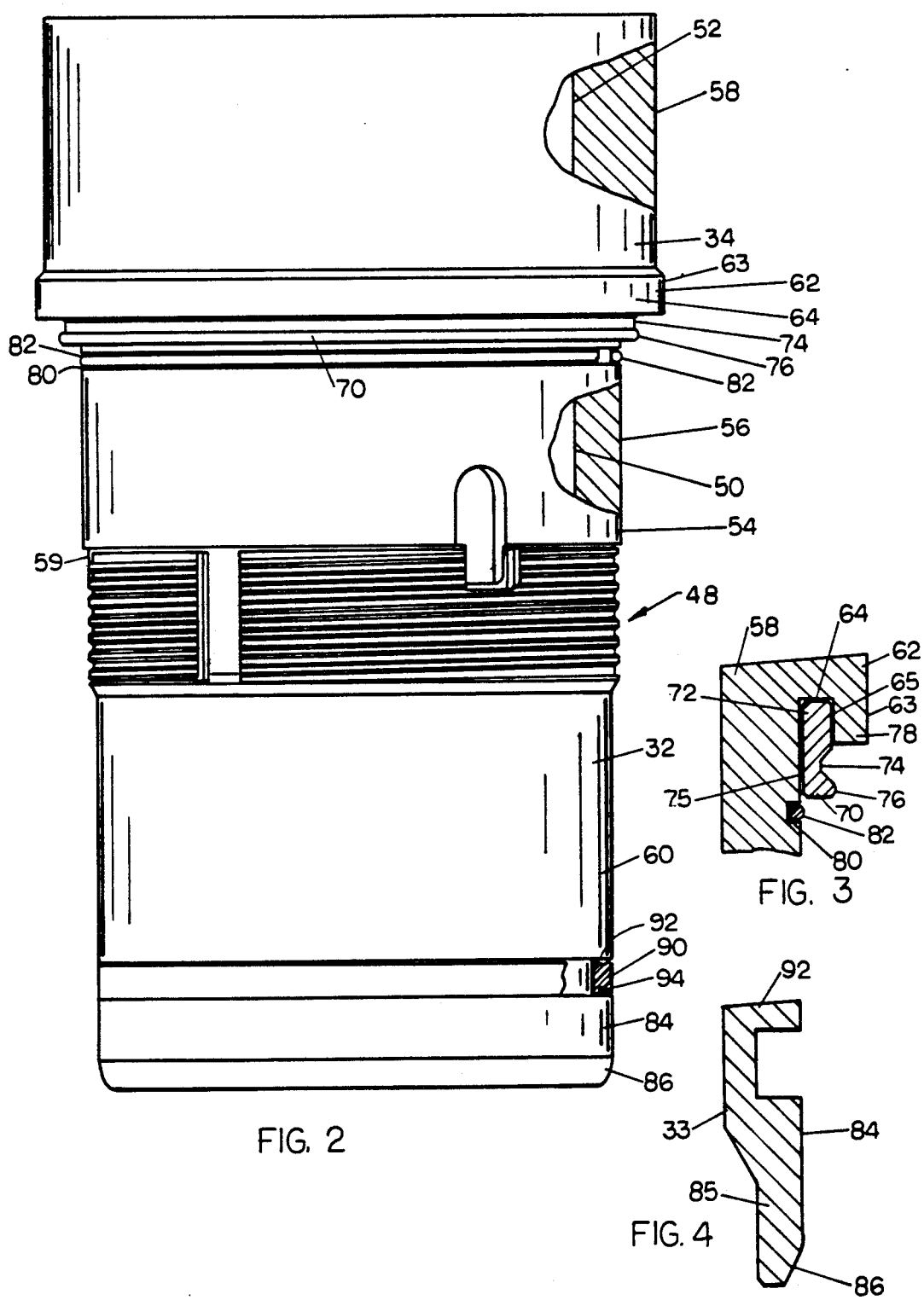
FIG. 2 is an elevation view, partially in cross-section, of the male member of the connection of FIG. 1 with the seals of the present invention disposed thereon.
FIG. 3 is a partial section view of FIG. 2 illustrating the heat shrink metal seal of the present invention.
FIG. 4 is a partial section view of FIG. 2 illustrating the metal-to-metal nose seal of the present invention.

Referring now to FIGS. 2–4, the sealing means for the connection between the above-described outer casing hanger 26 and stab-in and tie-back tool 34 for wellhead 10 are illustrated in greater detail. It should be understood that the sealing means of the present invention described for this connection may be used with other connections including those described above with respect to wellhead 10 and a description of the sealing means with reference to the stab-in and tie-back tool 34 of FIGS. 2 to 4 is illustrative of the use of sealing means of the present invention for other applications.

FIG. 2 shows the sealing means of the present invention disposed on the pin 32 of stab-in and tie-back tool 34. Although the sealing means may be disposed on either the pin 32 or the box 30, the sealing means is preferably disposed on the pin 32 since it is the retrievable portion of the connection thus permitting the refurbishing or replacement of the sealing means upon retrieval. The pin 32 includes an inner diameter 50 common to that of the flow bore 52 through stab-in and tie-back tool 34. The pin 32 includes an upper neck 56 having an outer diameter 54 which is smaller than that of the body 58 of stab-in and tie-back tool 34. A reduced diameter portion 60 on pin 32 extends below neck 56. The cooperable coupling means 48 is disposed adjacent to the transition 59 between neck 56 and reduced diameter portion 60 at the mid-portion of the pin 32.

Referring particularly to FIG. 3, an annular upset 62 is formed by an enlarged diameter portion 63 on body 58 adjacent neck 56. Neck 56 extends beneath enlarged diameter portion 63 by an undercut portion 65 forming an annular seal groove 64 at the base of neck 56. Seal groove 64 forms two opposed annular walls, one annular wall being formed by neck 56 and the other annular wall 78 being formed by enlarged diameter portion 63. The axis of annular groove 64 parallels the flow bore axis of tool 34 and has an opening that faces the upper terminal end of box 30.

The sealing means of the present invention includes a metal seal ring 70 adapted, as hereinafter described, to be received over neck 56 and having a portion thereof received by annular groove 64. Metal seal ring 70 includes an annular base 72, an annular relief 74, and an annular sealing lip 76. Annular relief 74 and lip 76 extend beyond the opening of annular groove 64. Annular relief 74 is disposed between base 72 and lip 76 on the outer diameter of ring 70 and causes lip 76 to project from metal seal ring 70 for sealing engagement with the inner annular surface of vertical wall 112 of box 30 of outer casing hanger 26 as hereinafter described. The inner annular surface of vertical wall 112 is an annular sealing surface adapted for interference engagement with annular sealing lip 76. The inner surface of wall 112 faces in a direction common to that of the inside diameter of annular wall 78. Annular relief 74 isolates the annular sealing lip 76 from the annular base 72 thereby enhancing the flexibility of annular sealing lip 76 in sealingly engagement with the annular sealing surface of the box 30 upon connection.

Metal seal ring 70 is made of aluminum bronze and is heat shrink fitted onto the inside diameter of annular wall 78 forming groove 64. A temperature difference of approximately 360° F. is required to create a sufficient diametrical differential between seal ring 70 and wall 78 to permit ring 70 to be inserted into groove 64 and shrink fitted onto wall 78.

Metal seal ring 70 is made of aluminum bronze for several reasons. The elastic modulus of aluminum bronze is less than that of steel. Therefore under pressure, the aluminum bronze seal ring 70 will have greater radial expansion than a steel ring. Further, the aluminum bronze seal ring 70 has more flexibility in its sealing engagement with box 30 because pressure will wedge the seal ring 70 tighter against box 30 as pressure increases. A steel seal ring might not achieve a greater seal under pressure where the aluminum bronze seal ring will have enhanced sealing capability up to any pressure that the wellhead component parts have been designed to withstand such as up to 50,000 psi. Also, the aluminum bronze seal ring 70 has a thermal expansion/contraction that is greater than steel. When the aluminum bronze seal ring is put into an ice bath for assembly, the aluminum bronze seal ring 70 will contract twice as much as that of steel because of its thermal expansion properties. The aluminum bronze seal ring 70 has the further advantage in that it does not tend to corrode as does steel. Steel tends to set up a corrosion cell which in long-term service, causes the seal ring to corrode. A copper seal ring, for example, causes a corrosion problem in long-term service.

One method of assembly of metal seal ring 70 includes placing the ring 70 in an ice bath for 10 to 15 minutes to reduce the temperature of ring 70 to approximately 32° F. The enlarged diameter portion 63 of pin body 58 is heated around its circumference at the seal groove 64 with a burner so that the wall 78 formed by undercut portion 65 is at least 325° F. The pin 32 is quickly removed from the heat of the burner and the metal seal ring 70 is dropped over the reduced diameter portion 60 and neck 56. The inside diameter of ring 70 is sized to receive neck 56 in its cooled and contracted state. The base 72 of ring 70 is then inserted into seal groove 64 with annular lip 76 exposed for subsequent engagement with the annular sealing surface of wall 112. Upon the temperature of the metal seal ring 70 rising as the wall 78 of pin body 58 is cooling, the outside diameter of metal seal ring 70 becomes shrink fitted onto the internal diameter of wall 78 of seal groove 64. An annular gap 75 is formed between the outside diameter of neck 56 and the inside diameter of ring 70. The gap 75 allows pressure to be applied to the inside diameter of ring 70 to energize and further expand the ring 70 into metal-to-metal sealing engagement with the box 30 of casing hanger 26 as hereinafter described.

Neck 56 also includes an annular groove 80 disposed below and adjacent to the installed position of metal seal ring 70 in seal groove 64. An elastomeric O-ring 82, such as O-ring Part No. 2-376, nitrile for temperature to 225° F. manufactured by Parker Seals of Lexington, Ky., is inserted in annular groove 80 for sealing engagement with the inner diameter 31 of box 30. Seal ring 82 seals any wash ports located above the connection. See for example wash ports 83 illustrated in FIG. 1.

The lower terminal end of pin 32 includes an integral seal nose 84 formed by reducing the inner diameter 33 of pin 32 thereby reducing the wall thickness of pin 32 at 85. The seal nose 84 has a chamfered or rounded end 86 for metal-to-metal sealing engagement with the inner diameter 31 of box 30.

An energized seal 90 is disposed in an annular groove 92 in pin 32 above and adjacent to seal nose 84. Energized seal 90 is preferably a Polypak seal, Part PN 31209125-625 Type B manufactured by Parker Seals of Lexington, KY. The Polypak seal includes an energizer O-ring 94.

Referring again to FIG. 1, box 30 of outer casing hanger 26 includes a major diameter portion 100, a medial diameter portion 102, and a minor diameter portion 104. Medial diameter portion 102 is sized to receive reduced diameter portion 60 and major diameter portion 100 is sized to receive neck 56 of stab-in and tie-back tool 34. The minor diameter portion 104 of outer casing hanger 26 has a smaller diameter than medial diameter portion 102. An upwardly facing conical sealing taper 106 is formed at the transition between minor diameter portion 104 and medial diameter portion 102. Conical sealing taper 106 provides a metal sealing surface for sealing engagement with seal nose 86 of pin 32.

A sealing groove 110 is provided on the interior side of the upper terminal end of box 30 to sealingly receive projecting annular lip 76 of metal seal ring 70. The vertical wall 112 of groove 110 provides the annular sealing surface for engagement by lip 76. Elastomeric seal 82 sealingly engages the inner diameter 31 of major diameter portion 100. Upon connection, annular seal ring 70 has one side that has one portion, base 72, shrink fitted onto wall 78 and another portion, lip 76, sealingly engaging the inner annular sealing surface of vertical wall 112.

Upon assembly of the connection between the stab-in and tie-back tool 34 and outer casing hanger 26, cooperable connection means 36 engages and connects tool 34 to hanger 26. Energized seal 90 sealingly engages the inner wall of medial diameter portion 102 to establish an initial seal. Then seal nose 86 lands on conical sealing taper 106 to establish a lower metal-to-metal seal. Energized seal 90 and seal nose 86, in this embodiment, provide the primary seals for the connection. Substantially simultaneously, at the upper end of box 30, O-ring 82 sealingly engages the inner diameter 31 of major diameter portion 100. Concurrently, annular lip 76 is received by seal groove 110 and establishes an upper metal-to-metal seal by interference engagement with the vertical wall 112 of sealing groove 110. Elastomeric seal 82 and metal-to-metal seal 70 provide backup seals for the connection. Both elastomeric and metal-to-metal seals are established above and below connection means 36 to seal the connection of tool 34 and hanger 26. Upon pressurizing the flow bore of outer casing hanger 26 and leakage of the primary seals, this pressure is applied to the inside diameter of ring 70 causing ring 70 to expand into further sealing engagement with wall 112 of hanger 26. Upon the interference engagement of annular lip 76 with vertical wall 112, the metal-to-metal seal ring 70 is placed in compression hoop stress of 50 to 100% of yield of aluminum bronze. Subsequently, if flow bore pressure is applied to seal ring 70, the hoop stress is relieved enhancing the sealing engagement of annular lip 76 against vertical wall 112. Thus, the greater the flow bore pressure applied to metal-to-metal seal ring 70, the greater the sealing engagement of the metal-to-metal seal.

While a preferred embodiment of the invention has been shown and described, modifications thereof can be made by one skilled in the art without departing from the spirit of the invention.

What is claimed is:

1. A connection, comprising:
   a first tubular member having a flow axis and an annular shoulder;
   a second tubular member adapted for engagement with said first tubular member and having an annular sealing surface;
   cooperable connection means disposed on said members for coupling said member;
   said shoulder having an annular groove forming a first annular wall opposite and parallel a second annular wall, said
   first annular wall facing in the same direction as that of said annular sealing surface;
   a metal seal ring shrink fitted onto said first annular wall of said annular groove and not onto said second annular wall; and
   said metal seal ring sealingly engaging said annular sealing surface of said second tubular member thereby establishing a metal-to-metal seal between said members.

2. The connection of claim 1 wherein said metal seal ring includes an annular lip which sealingly engages said annular sealing surface of said second tubular member.

3. The connection of claim 1 wherein said annular sealing surface of said second tubular member is disposed in an annular recess which sealingly receives said metal seal ring.

4. The connection of claim 1 wherein said shoulder is formed at a transition in diameters on said first tubular member.

5. The connection of claim 1 wherein said annular groove is coaxial with the flow axis of said first tubular member.

6. The connection of claim 1 wherein said metal seal ring is made of a metal having an modulus of elasticity less than that of steel.

7. The connection of claim 1 wherein said metal seal ring is made of a metal having a thermal expansion/contraction greater than that of steel.

8. The connection of claim 1 wherein said metal seal ring is made of aluminum bronze.

9. The connection of claim 1 wherein said metal seal ring includes an annular lip for sealingly engaging said annular sealing surface and clearance is provided between said metal seal ring and said second annular wall to allow pressurization behind said metal seal ring for actuating said annular lip into sealing engagement with said annular sealing surface.

10. The connection of claim 9 wherein said metal seal ring includes an annular relief groove to enhance the flexibility of said annular lip.

11. The connection of claim 1 wherein said metal seal ring interferingly engages said annular sealing surface placing said metal seal ring in compression hoop stress.

12. A connection, comprising:
a first tubular member having an annular shoulder;
a second tubular member adapted for engagement with said first tubular member and having an annular sealing surface;
cooperable connection means disposed on said members for coupling said members;
said shoulder having an annular groove forming a first annular wall opposite and parallel a second annular wall, said first annular wall facing in the same direction as that of said annular sealing surface;
a metal seal ring shrink fitted onto said first annular wall of said annular groove;
said metal seal ring sealingly engaging said annular sealing surface of said second tubular member thereby establishing a metal-to-metal seal between said members;
said metal seal ring interferingly engaging said annular sealing surface placing said metal seal ring in compression hoop stress;
said compression hoop stress being 50 to 100 percent of yield of aluminum bronze.

13. A connection, comprising:
a first tubular member having an annular shoulder;
a second tubular member adapted for engagement with said first tubular member and having an annular sealing surface;
cooperable connection means disposed on said members for coupling said members;
said shoulder having an annular groove forming a first annular wall opposite and parallel a second annular wall, said first annular wall facing in the same direction as that of said annular sealing surface;
a metal seal ring shrink fitted onto said first annular wall of said annular groove;
said metal seal ring sealingly engaging said annular sealing surface of said second tubular member thereby establishing a metal-to-metal seal between said members;
an elastomeric seal being disposed on said first tubular member adjacent said metal seal ring.

14. The connection of claim 1 wherein said first tubular member includes a seal nose for engagement with said second tubular member.

15. The connection of claim 14 wherein said second tubular member includes a tapered sealing surface for sealing engagement with said seal nose of said first tubular member.

16. The connection of claim 1 wherein said first tubular member includes an energized seal disposed adjacent a terminal end of said first tubular member for engagement with said second tubular member.

* * * * *